INVENTOR
Pierre PARENT
BY Pierre L'espérance
PATENT AGENT

July 15, 1969   P. PARENT   3,455,405
MULTITRACK SNOW VEHICLE
Filed Jan. 2, 1968   4 Sheets-Sheet 4

INVENTOR
Pierre PARENT

BY Pierre Lesperance

PATENT AGENT 3,455,405
MULTITRACK SNOW VEHICLE
Pierre Parent, 23 St. Henri St. E., Ste. Agathe des Monts,
Quebec, Canada
Filed Jan. 2, 1968, Ser. No. 695,008
Int. Cl. B62d 55/06
U.S. Cl. 180—9.46                                   11 Claims

ABSTRACT OF THE DISCLOSURE

This invention concerns a multitrack vehicle comprising an elongated platform disposed over front and back assemblies of endless track units disposed side by side, so that the tracks of each assembly engage the ground practically across the whole width of the platform, the units of each assembly rockable independently of each other, each assembly being steerable, engine means mounted on the platform and transmission means connecting the engine means to each endless track unit of each assembly. This vehicle is particularly used for compacting fresh snow on ski runs, airplane landing strips and the like and can compact the snow over subsantially the entire width of the vehicle; the vehicle is also capable of negotiating very rough ground.

---

The present invention relates to an endless track vehicle, more particularly used for snow traversing, that is for compacting fresh snow on ski runs, airplane landing strips, car parking lots and the like.

There is already known a vehicle for this purpose comprising a pair of endless track units at the front and the back, each pair of units being steerable and all the endless track units being independently oscillatable or rockable. However, this known vehicle requires a substantial number of passes to compact a given snow-covered area, as the overall width of the track units is relatively small compared to the overall width of the vehicle.

It is, therefore, the general object of the present invention to provide an endless track vehicle capable of compacting snow over a wide path and, more specifically, over practically the entire width of the vehicle.

Another object of the invention resides in the provision of a vehicle of the character described, in which the tracks provide a very large ground-engaging surface whereby the vehicle can negotiate very steep hills, not usually accessible by conventional four-track vehicles.

Another object of the present invention resides in the provision of a vehicle of the character described, which can negotiate highly uneven ground, due mainly to the fact that the front assembly of the endless track units can oscillate transversely of the vehicle to a much greater degree than is possible with conventional vehicles.

Another object of the present invention resides in the provision of a vehicle of the character described, which can be used for other purposes than snow compacting, such as carrying or hauling loads over snow-covered ground and in any type of off-road terrain.

The foregoing and other objects of the present invention will become more apparent during the following disclosure and by referring to the drawings, in which.

In the drawings, like reference characters indicate like elements throughout.

Figure 1:
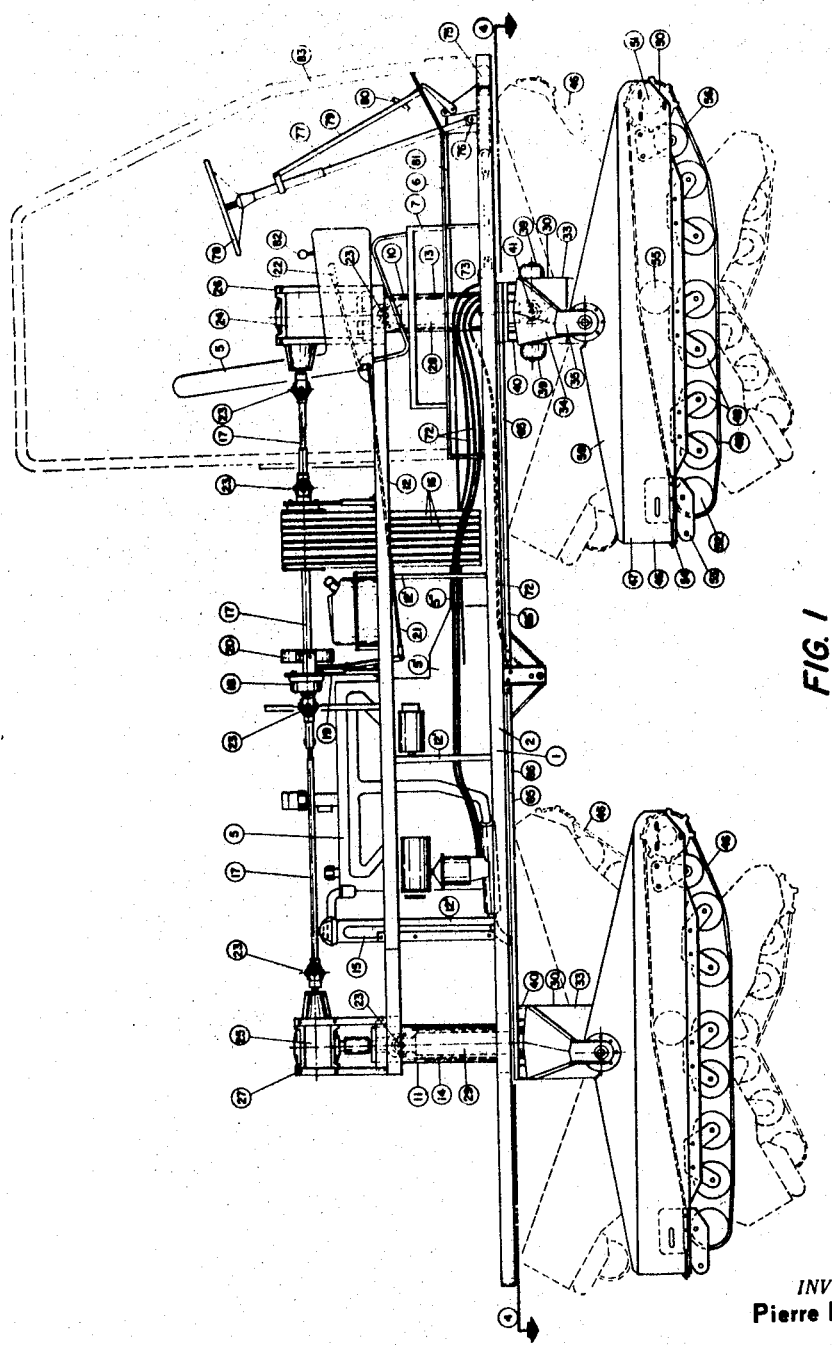
FIGURE 1 is a side elevation of the multitrack vehicle in accordance with the invention.

The vehicle in accordance with the invention comprises a flat chassis 1, of generally rectangular shape, comprising a perimetral frame member 2, longitudinal stringers 3 and transverse frame members 4 rigidly attached to one another.

An internal combustion engine 5 is mounted centrally and longitudinally of the chassis 1. At the front of the vehicle are mounted superposed box frames 6 and 7, the box frame 6 serving as a footrest, and top box frame 7 serving as a support for a pair of seats, namely; driver's seat 8 and passengers' seat 8' which are disposed side by side. The area of the chassis 1 surrounding the engine 5, is closed by panels 9, preferably made of light weight expanded metal, or trellis work, forming a floor to give access to the engine and other mechanical elements. Thus, the chassis 1 together with the panels 9 from a flat platform. Along the center line of the platform, at the front and back thereof, are mounted upright tubes, namely: front tube 10 and back tube 11.

The front tube 10 extends between the two seats 8 and 8'. These tubes are stiffened by longitudinal horizontal bracing members 12 secured to the upper ends of said tubes and supported above chassis 1 by uprights 12'.

Inner tubes 13 and 14 respectively are rotatably mounted within the outer tubes 10 and 11, being journalled therein by means of, for instance, brass bushings located near the upper end of the tubes 13, 14 and at the level of the chassis 1. Thus, the inner tubes 13, 14 can rotate about vertical axes, supposing the platform is horizontal.

The engine 5 has a rearwardly facing radiator 15 and at the front a clutch box 5' and a transmission 5" with an output shaft driving through a series of pulleys and rubber belts 16, a transmission shaft 17 horizontally disposed along the center line of the chassis 1 above the engine 5. Said transmission shaft is supported at its center portion by a bearing assembly 18, in turn carried by a bracket 19, secured to the braces 17 or to the chassis 1. The shaft 17, adjacent bearing 18, carries a braking assembly 20 which is operated through linkage 21 by hand brake lever 22 from the driver's seat.

The transmission shaft 17 comprises a series of universal joints 23 and is connected to angle drives 24 and 25 mounted in housings 26 and 27 respectively, secured to the top of the front and back tubes 10 and 11, respectively.

Angle drives 24 and 25 are connected through universal joints 23 to vertical shafts 28 and 29 extending through the inner front and back tubes 13 and 14, respectively.

A front yoke member 30 is arranged transversely of the vehicle underneath the chassis 1. This yoke member comprises a central box-shaped housing 33, to which are rigidly secured two laterally extending arms 34 having at their outer ends downward extensions 35.

A shaft 36, made of two sections, extends under the yoke member 32 throughout the length of the latter. Shaft 36 is journalled at its ends at 37 in extensions 35. The central portion of shaft 36 extends through housing 33 and through a differential casing 38 within said housing and secured thereto.

The housing 33 is pivotally suspended at its top by a pair of longitudinally extending pivot pins 39 from a bracket or head 40, rigidly secured to the lower end of the front inner tube 30.

The lower end of the vertical drive shaft 28 is provided with a universal joint 41, disposed within housing 33, and having its axes intersecting the center line of the pivot pins 39. This vertical shaft 28 extends freely through head 40 and housing 33 and beyond the universal joint 41, it enters casing 38, wherein it is journalled and the lower end of the shaft is fitted with bevelled pinion 43 engaging a bevelled crown gear 44 of a differential 45 connected to the two sections of the main shaft 36 and journalled in casing 38. Pinion 43 and bevelled gear 44 form an angle drive for the main shaft 36, whereby this shaft is directly rotated by the engine 5 with a differential action.

It should be noted that, if desired, the main shaft 36 could be made of one unit actuated by bevelled gear 44, without any differential.

A plurality, namely four in the example shown, of endless track units 46 are pivotally or rockably suspended from the main shaft 36.

Each endless track unit 46 includes an elongated housing 47 open at its bottom, in which are spring or rubber-mounted a plurality of track bearing idle rollers 48 engaging the bottom run of an endless track 49 across the length and width thereof. Said bottom run protrudes from housing 47 and the top run 49 freely extends within the housing.

At the front of each housing unit, are mounted sprocket wheels 50, the shaft 51 of which protrudes from the side of the housing 47. The sprocket wheels 50 serve to drive the endless track 49.

The back end of the track is mounted on idle rollers 52 which are longitudinally adjustable to adjust the tautness of the endless track, said rollers being mounted on a bracket 53 longitudinally locked along the housing by means of bolts and nuts 54. The top return run of the track is trained on idle rollers 55 within housing 47.

The bottom active run of the endless track is arranged so as to be forwardly inclined, as shown in 56, at the front of the housing 47 so as to better engage uneven ground.

Sprocket wheel shaft 51 is driven from main shaft 36 through a sprocket gear and chain assembly 57 normally protected by a chain box 58 extending on the side of the endless track unit housing 47.

The endless track units 46 are disposed side by side longitudinally of the vehicle and as close as possible to one another so that the endless tracks 49 will engage the ground over about three-quarters of the width of the vehicle.

A pair of longitudinally extending suspension plates 59 are secured to the top of each endless track unit housing 47. These plates are apertured to receive the main shaft 36 and also tubes 60 surrounding the main shaft 36 and extending between each pair of suspending plates 59 and secured thereto.

The tubes 60 are rotatably supported on the main shaft 36 by means of ball bearings 61 and bushing 62. Thus, each endless track unit 46 can pivot about the drive shaft at 46 in a rocking movement, as clearly shown in FIGURE 1. The amplitude of rocking movement is large, being limited by the front and rear ends of the endless track housing 47 reaching the chassis 1.

Figure 2:
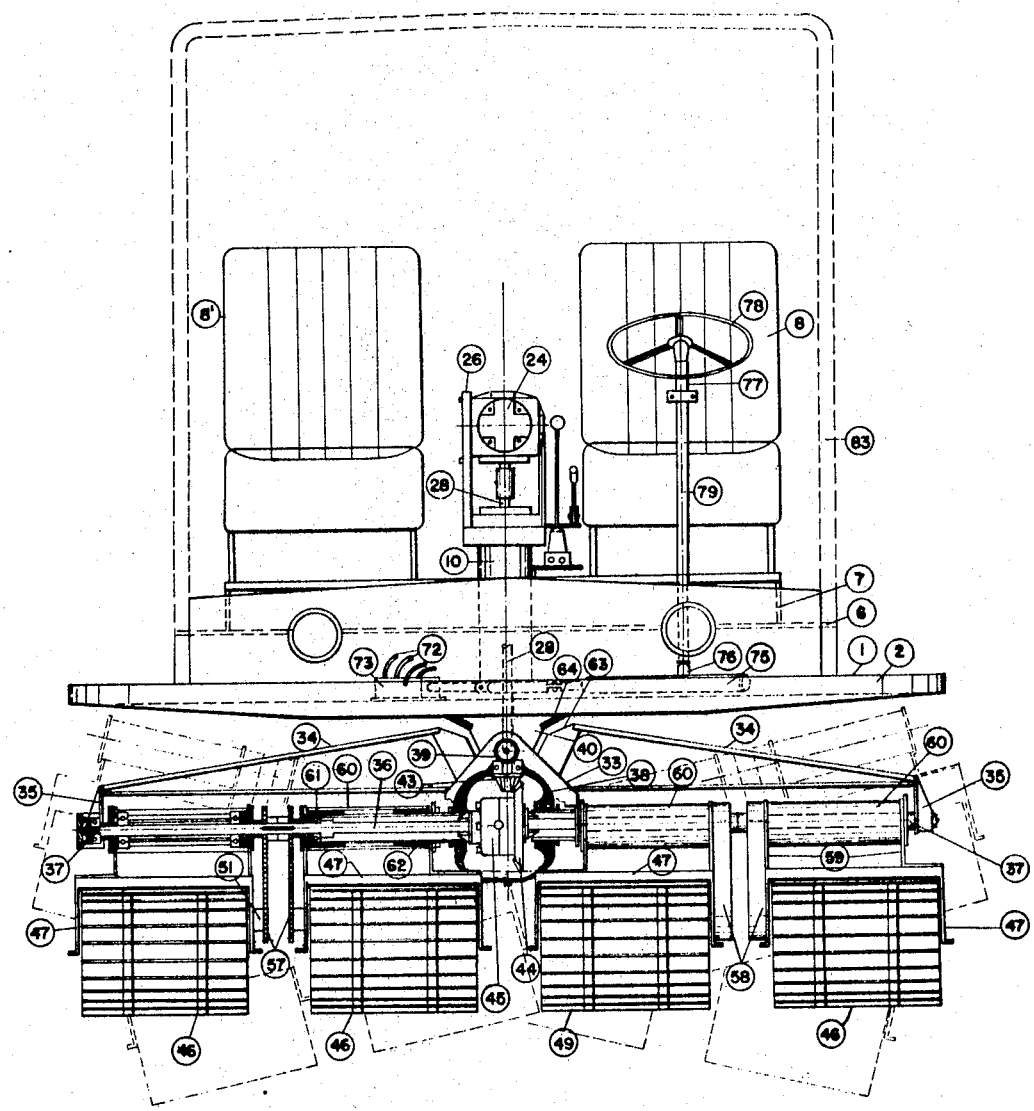
FIGURE 2 is a front end elevation, partially in section.
Figure 3:
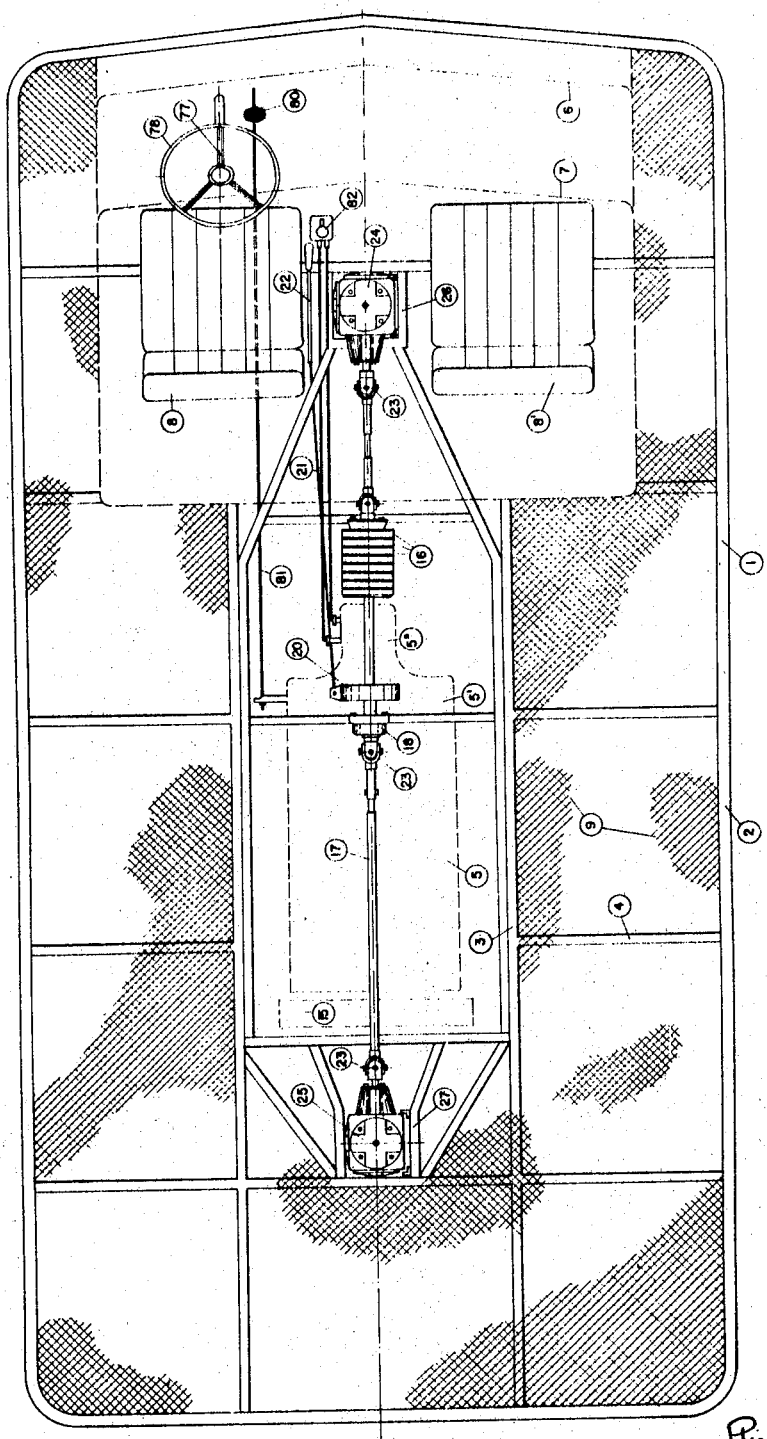
FIGURE 3 is a top plan view.

Each endless track unit 46 is rockable independently of one another. The endless tracks 49 are driven directly from the shaft 36 through the chain and sprocket gear arrangement 57. The assembly of the four endless track units 46 suspended from the main shaft 36 and the yoke member 32 can pivot as a unit transversely of the vehicle, as clearly shown in FIGURE 2, the pivoting movement being effected through the two aligned pivot pins 39.

This transverse pivoting movement is limited by the portions 63 of the arms 34 of yoke member 32 abutting against rubber pads 64 lining corresponding portions of head 40.

It will be noted that the universal joint 41 is in direct alignment with the two pivot pins 39 so as to allow this transverse pivoting movement of the front assembly of endless track units 46.

The vehicle in accordance with the invention is provided with a back assembly of four endless tracks units 46' disposed side by side as the front endless track units 46 and of identical construction.

The only difference between the front and back assemblies of endless track units resides in the fact that there are no pivot pins 39 at the back of the vehicle, the head 40' being integral with the housing 33' of the transverse yoke member 30'.

The endless tracks 49' at the back of the vehicle are driven from the back vertical shaft 29 by the same system, as previously described, for the front assembly and the back endless track units 46' are pivoted for independent rockable movement longitudinally of the vehicle in the same way as the units of the front assembly. Because the back assembly of endless track units 46' cannot pivot transversely of the vehicle, stabilization of the platform or chassis 1 is obtained.

Both front and back assemblies of endless track units 46 and 46' are steerable, that is, pivotable about the vertical axes of the tubes 10–13, 11–14, respectively.

The front and back endless track assemblies are arranged to pivot in opposite directions but simultaneously and with the same amplitude of movement. It should be noted that the vehicle can turn on a very short radius, because no universal joints are used for steering; the inner tubes 13, 14 simply rotate within outer tubes 10 and 11.

Figure 4:
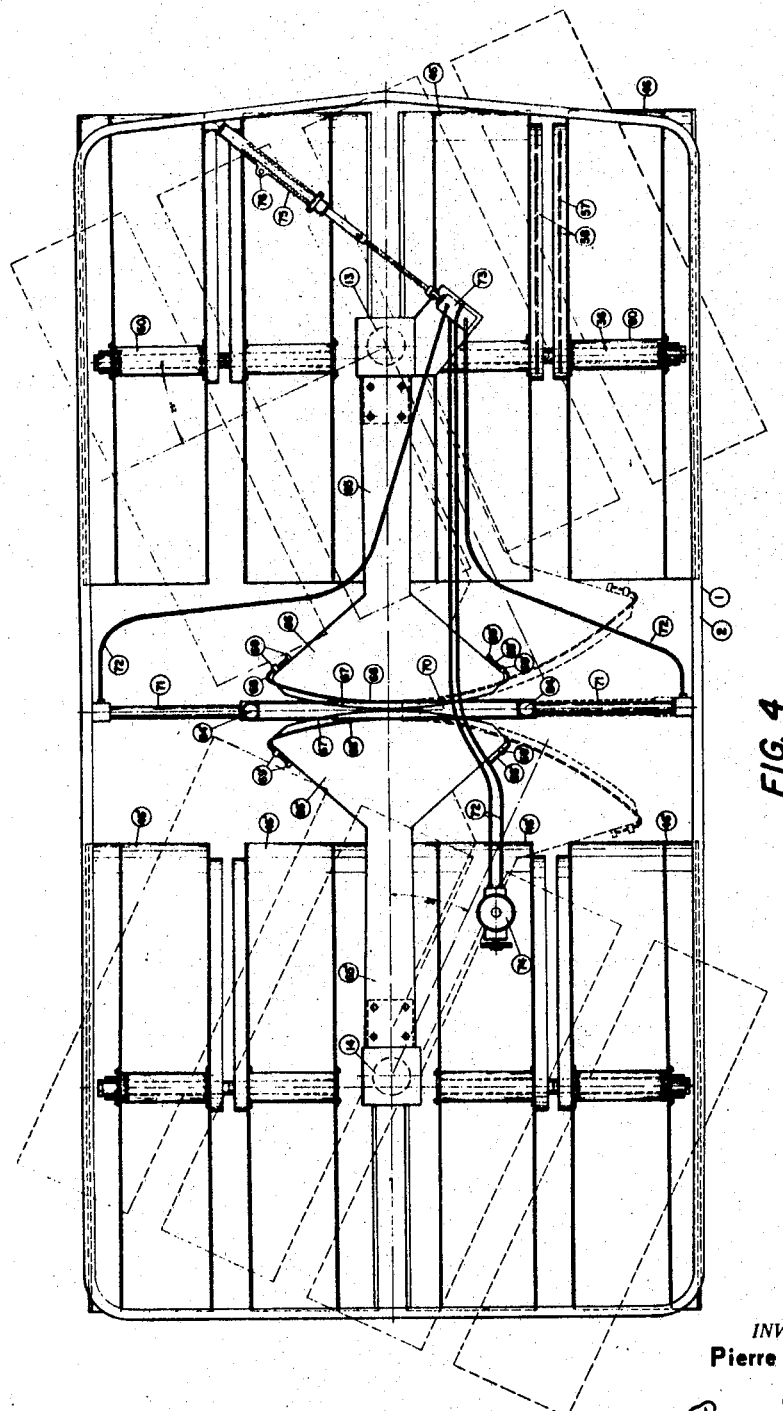
FIGURE 4 is a plan section taken along line 4—4 of FIGURE 4.

The steering system is more particularly shown in FIGURE 4 and also in FIGURE 1. Long flat arms 65, 65' are secured to the lower end of the inner tubes 13 and 14 respectively. These arms lie substantially within the thickness of the platform or chassis 1 underneath the transverse members 4 and stringers 5. They are directed towards the center of the vehicle where they are formed with an enlarged head 66–66', respectively, of fan shape, having a convex base edge 67–67', respectively.

A double acting cylinder and piston unit 70, 71 is mounted transversely of the vehicle under the base edges 67, 67'.

Piston tube 71 is secured to the chassis 1, is closed at its outer ends and has a plug and a piston at its center, the plug closing the tube. Piston tube 71 has perforations adjacent both sides of the piston. Cylinder 70 is forced to move in a selected direction by supplying fluid under pressure to the tube end towards which the cylinder is moving.

A steel cable 68 is adjustably secured at both ends by brackets 69, to the same sides of the fan-shaped heads 66–66', and the intermediate portions of the cable 68 follow a groove made in the convex edges 67–67', while the center of cable 68 is attached at 84 to the end of cylinder 70 opposite brackets 69.

A second cable 68' is inversely arranged relative to cable 68. Its center is attached at 84' to the end of cylinder 70 opposite attachment 84 and its ends are adjustably secured by brackets 69' to the same sides of heads 66, 66', which are opposite to the sides carrying brackets 69. The intermediate portion of cable 68' runs in base edge grooves receiving cable 68.

The tube 71 is fed with hydraulic oil, under pressure at both ends, by conduits 72 connected to a hydraulic control valve 73. A hydraulic pump 74 is directly driven by the engine 5 and supplies oil to the valve 73. This valve is of the plunger type and is controlled by a rack and pinion unit 75, the pinion being secured at 76 to the lower end of a steering shaft 77 (see FIG. 1), provided at its top with a steering wheel 78 disposed in front of the driver's seat 8.

The steering shaft 77 is braced by member 79. In front of the driver's seat is also disposed a clutch pedal 80 for actuating a clutch linkage 81 operating the clutch in the clutch box 5' of the engine. The transmission box 5" of the engine is operated by a change speed lever 82 disposed on the side of the driver's seat 8.

No braking system other than the hand brake lever 22 operating the braking system 20 on the transmission shaft 17, is required; this braking system is operated when the engine is declutched.

The vehicle in accordance with the invention can travel at about twice the speed of conventional snow traversing vehicles. It compacts snow over practically the entire width of the chassis 1, due to the fact that the vehicle normally works on steep and uneven ground and, therefore, rarely moves in a straight line. Therefore, the small spacings between the front endless track units 46 are compacted by the back endless track units 46'. Therefore, in practice, the entire snow surface under the vehicle is compacted in a single pass.

Due to the high amplitude of longitudinal pivotal movement of the front and back endless track units 46 and 46', and due to the fact that the front assembly of endless track units can pivot laterally of the vehicle, the same can negotiate very uneven ground in a very smooth manner. Also, the eight tracks of the vehicle engage the ground over a very large surface and, therefore, the vehicle can negotiate much steeper hills than a conventional four-track unit.

The very short turning radius of the vehicle is an extremely important feature of the vehicle.

It will also be noted that the vehicle is made of light weight construction and that, because the front endless track units 46 are pivotable laterally of the vehicle to a great extent, it is unnecessary to provide heavy bracing against torsional forces which might otherwise be produced within the chassis.

The steering system is very efficient, is positive acting and yet is simple in construction.

Although a differential unit such as differential 45 is preferred, it has been found in practice—especially for snow-covered area—that this differential can be easily dispensed with and the main shaft 36 of the front and back assemblies of endless track units can be made in one piece and directly operated by the bevelled gear 44. The differential movement of the inner track with respect to the outer track is easily compensated by a certain amount of slipping between the track and the snow.

The passenger compartment is preferably protected against the weather by a passenger cabin 83 provided with large glass panes for clear vision.

While a preferred embodiment in accordance with the invention has been illustrated and described, it is understood that various modifications may be resorted to.

What I claim is:

1. In a multitrack vehicle, an elongated platform, vertical tubular members carried by and extending through said platform, said tubular members disposed along the center line of the platform near the back and front thereof, said tubular members rotatable with respect to said platform about their vertical axes, assemblies of endless track units disposed under said platform and attached to the lower portion of said tubular members, the endless track units of each assembly disposed side by side, so that the tracks of each assembly engage the ground across the major portion of the width of said platform, each unit being mounted to pivot about a horizontal transverse axis relative to the platform independently of one another, engine means mounted on said platform and transmission means connecting the engine means to each endless track unit of each assembly, said trasmission means including shaft portions extending through said tubular members.

2. In a multitrack vehicle as claimed in claim 1, wherein the back assembly is fixed against rocking movement with respect to its associated tubular member, transversely of the platform, and the front assembly is pivotally connected to the lower portion of its associated tubular member for rockable movement of the front assembly transversely of the platform.

3. In a multitrack unit as claimed in claim 2, further including means to limit the amplitude of transverse rocking movement of the front assembly of endless track units.

4. In a multitrack vehicle as claimed in claim 1, wherein each assembly consists of at least four endless track units.

5. In a multitrack vehicle as claimed in claim 1, further including a steering system for said front and back assemblies of endless track units, said steering system including arms rigidly secured to said pivotable tubular members and power means to rotate said arms in unison.

6. In a multitrack vehicle as claimed in claim 5, wherein said steering power means rotate said arms in opposite directions of rotation.

7. In a multitrack vehicle, a platform, front and back upright tubular members mounted on the platform for rotation about their longitudinal axes, steering means mounted on the platform and connected to said tubular members for rotating the same about their vertical axes, yoke members connected at their centers to the lower end of said tubular members and extending transversely of the platform under the same, a drive shaft rotatably carried by each yoke member, longitudinally of the latter, and under the same, a plurality of endless track units, each having a frame rotatably suspended from said drive shaft, disposed side by side longitudinally of the vehicle and rotatable about said drive shaft independently of each other, said drive shaft drivingly connected to the endless track of each unit, engine means mounted on said chassis and transmission means connecting said engine to the respective drive shafts for rotating the same, said transmission means including shaft portions extending through said tubular members.

8. In a multitrack vehicle as claimed in claim 7, wherein only the yoke member associated with the front tubular member, is pivotally connected thereto for transverse rocking movement of said yoke member and, consequently, of the front assembly of endless track units and the transmission shaft portions extending through said front tubular member is provided with a universal joint in alignment with the pivot connection between said yoke member and said front tubular member.

9. In a multitrack vehicle as claimed in claim 8, wherein each endless track unit comprises an endless track, a sprocket gear for driving said track and a transmission between said sprocket gear and said drive shaft.

10. In a multitrack vehicle as claimed in claim 8, wherein said transmission means include shafting extending above said engine longitudinally of the center line of said platform, angle drives connected to both ends of said shafting and to the shaft portions extending through said tubular members.

11. In a multitrack vehicle as claimed in claim 8, wherein said steering means include flat arms secured at one end to the respective front and back upright tubular members, and extending towards each other in substantially the plane of said platform, and power means having a movable member attached to the adjacent ends of said arms to rotate said arms in unison and in opposite directions of rotation.

References Cited

UNITED STATES PATENTS

| | | | |
|---|---|---|---|
| 1,254,819 | 1/1918 | Leyner | 180—9.46 X |
| 2,906,358 | 9/1959 | Tucker | 180—50 X |
| 2,966,223 | 12/1960 | Gleasman | 180—50 X |
| 3,023,826 | 3/1962 | Larson | 180—50 X |

FOREIGN PATENTS

| | | |
|---|---|---|
| 251,847 | 5/1926 | Great Britain. |
| 743,457 | 9/1966 | Canada. |
| 471,511 | 2/1929 | Germany. |

RICHARD J. JOHNSON, Primary Examiner

U.S. Cl. X.R.

180—9.5, 9.64, 50